United States Patent
Lu et al.

(10) Patent No.: US 10,234,162 B2
(45) Date of Patent: Mar. 19, 2019

(54) CONTROLLER, INDOOR ENVIRONMENT ADJUSTMENT SYSTEM, AND INDOOR ENVIRONMENT ADJUSTMENT METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pengcheng Lu, Beijing (CN); Xiaochuan Chen, Beijing (CN); Ming Yang, Beijing (CN); Qian Wang, Beijing (CN); Rui Xu, Beijing (CN); Lei Wang, Beijing (CN); Peng Liu, Beijing (CN); Jiantao Liu, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 222 days.

(21) Appl. No.: 15/304,615

(22) PCT Filed: Dec. 11, 2015

(86) PCT No.: PCT/CN2015/097163
§ 371 (c)(1),
(2) Date: Oct. 17, 2016

(87) PCT Pub. No.: WO2016/184085
PCT Pub. Date: Nov. 24, 2016

(65) Prior Publication Data
US 2017/0138626 A1  May 18, 2017

(30) Foreign Application Priority Data
May 21, 2015 (CN) .......................... 2015 1 0264052

(51) Int. Cl.
*F24F 11/00* (2018.01)
*G05B 15/02* (2006.01)
(Continued)

(52) U.S. Cl.
CPC ............... *F24F 11/62* (2018.01); *F24F 11/30* (2018.01); *G05B 15/02* (2013.01); *F24F 11/52* (2018.01);
(Continued)

(58) Field of Classification Search
CPC .. F24F 11/30; F24F 11/52; F24F 11/62; F24F 11/65; F24F 2110/10; F24F 2110/20;
(Continued)

(56) References Cited

U.S. PATENT DOCUMENTS

2009/0322542 A1* 12/2009 Ding ................. F24F 11/30
340/588
2013/0200725 A1* 8/2013 Apelker ................. G05B 15/02
307/117
(Continued)

FOREIGN PATENT DOCUMENTS

CN      101188042 A    5/2008
CN      101397647 A    4/2009
(Continued)

OTHER PUBLICATIONS

Third Office Action for Chinese Application No. 201510264052.4, dated Jan. 10, 2018, 8 Pages.
(Continued)

*Primary Examiner* — Yuhui R Pan
(74) *Attorney, Agent, or Firm* — Brooks Kushman P.C.

(57) ABSTRACT

A controller, an indoor environment adjustment system and an indoor environment adjustment method are provided so as to automatically adjust an indoor environment. The controller is connected to at least one sensor and at least one
(Continued)

smart home device, and configured to acquire indoor environment parameters collected by the at least one sensor, and send an adjustment instruction to the at least one smart home device in accordance with the indoor environment parameters.

14 Claims, 6 Drawing Sheets

(51) Int. Cl.
*F24F 11/62* (2018.01)
*F24F 11/30* (2018.01)
*F24F 11/52* (2018.01)
*F24F 110/20* (2018.01)
*F24F 110/10* (2018.01)
*F24F 11/65* (2018.01)
*F24F 110/72* (2018.01)
*F24F 110/64* (2018.01)

(52) U.S. Cl.
CPC ........... *F24F 11/65* (2018.01); *F24F 2110/10* (2018.01); *F24F 2110/20* (2018.01); *F24F 2110/64* (2018.01); *F24F 2110/72* (2018.01); *G05B 2219/2614* (2013.01)

(58) Field of Classification Search
CPC ... F24F 2110/64; F24F 2110/72; G05B 15/02; G05B 2219/2614; Y02A 50/243; Y02A 50/25
See application file for complete search history.

(56) References Cited

U.S. PATENT DOCUMENTS

| | | | |
|---|---|---|---|
| 2014/0009300 | A1 | 1/2014 | Ha et al. |
| 2015/0163945 | A1* | 6/2015 | Barton ................... F24F 11/006 361/809 |

FOREIGN PATENT DOCUMENTS

| | | |
|---|---|---|
| CN | 201955676 U | 8/2011 |
| CN | 202929445 U | 5/2013 |
| CN | 103197647 A | 7/2013 |
| CN | 203101955 U | 7/2013 |
| CN | 104133427 A | 11/2014 |
| CN | 104216294 A | 12/2014 |
| CN | 104807147 A | 7/2015 |

OTHER PUBLICATIONS

Chinese First Office Action for Chinese Application No. 201510264052.4, dated Jan. 18, 2017, 8 Pages.
International Search Report and Written Opinion for Application No. PCT/CN2015/097163, dated Mar. 7, 2016, 13 Pages.
Second Office Action for Chinese Application No. 201510264052.4, dated Jun. 29, 2017, 7 Pages.

* cited by examiner

CONTROLLER, INDOOR ENVIRONMENT ADJUSTMENT SYSTEM, AND INDOOR ENVIRONMENT ADJUSTMENT METHOD

CROSS-REFERENCE TO RELATED APPLICATIONS

This application is the U.S. national phase of PCT Application No. PCT/CN2015/097163 filed on Dec. 11, 2015, which claims priority to Chinese Patent Application No. 201510264052.4 filed on May 21, 2015, the disclosures of which are incorporated in their entirety by reference herein.

TECHNICAL FIELD

The present disclosure relates to the field of smart home technology, in particular to a controller, an indoor environment adjustment system and an indoor environment adjustment method.

BACKGROUND

Along with the development of social economy and the improvement of living standards, more demands are put forward on living environment. However, in real life, it is usually difficult to understand an indoor environment in a clear and detailed manner, so it is impossible to take measures to improve the indoor environment in time. Instead, the indoor environment may be improved by opening a window or starting such indoor devices as humidifier, air regeneration device and air conditioner for ventilation and temperature adjustment, only in the case that a person does not feel well.

SUMMARY

An object of the present disclosure is to provide a controller, an indoor environment adjustment system, and an indoor environment adjustment method, so as to automatically adjust an indoor environment.

In one aspect, the present disclosure provides in some embodiments a controller connected to at least one sensor and at least one smart home device, and configured to acquire indoor environment parameters collected by the at least one sensor, and send an adjustment instruction to the at least one smart home device in accordance with the indoor environment parameters.

Optionally, the controller includes a control module, and a touch display module configured to display operation control information, acquire a user instruction in accordance with the operation control information, and send the user instruction to the control module. The operation control information at least includes indicators for indicating full-automatic control information, semi-automatic control information and the smart home device. The control module is configured to acquire the indoor environment parameters from the at least one sensor in accordance with the user instruction, and send the adjustment instruction to the at least one smart home device in accordance with the indoor environment parameters. The touch display module is further configured to display the indoor environment parameters acquired by the control module.

Optionally, in the case that the user instruction indicates that a user has selected the full-automatic control information, the control module is configured to acquire the indoor environment parameters from all the sensors, determine whether or not the indoor environment parameters acquired by each sensor meet a predetermined requirement in accordance with a predetermined priority level, and in the case that the indoor environment parameters acquired by each sensor do not meet the predetermined requirement, send the adjustment instruction to the corresponding smart home device. In the case that the user instruction indicates that the user has selected the semi-automatic control information and the smart home device, the control module is configured to acquire the indoor environment parameters from the sensor corresponding to the smart home device, determine whether or not the indoor environment parameters meet the predetermined requirement, and in the case that the indoor environment parameters do not meet the predetermined requirement, send the adjustment instruction to the smart home device.

Optionally, the controller further includes a warning device connected to the control module, and in the case that the control module determines that a gas concentration in the indoor environment parameters does not meet the predetermined requirement, a warning signal is sent to the warning device so that the warning device sends an audible warning.

Optionally, the operation control information further includes an indicator for indicating the warning device, and in the case that the user instruction indicates that the user has selected the warning device, the control module is further configured to turn off the warning device connected thereto.

Optionally, the operation control information further includes an indicator for indicating network connection information. In the case that the user instruction indicates that the user has selected the network connection information, the control module is further configured to acquire outdoor environment parameters via a communication module, and the touch display module is further configured to display the outdoor environment parameters acquired by the control module. The controller further includes the communication module.

In another aspect, the present disclosure provides in some embodiments an indoor environment adjustment system, including at least one sensor, at least one smart home device and the above-mentioned controller. The sensor is configured to collect indoor environment parameters, and the smart home device is configured to receive an adjustment instruction from the controller and perform an adjustment operation in accordance with the adjustment instruction.

Optionally, the indoor environment adjustment system further includes a mobile terminal, the control module of the controller is further configured to send the indoor environment parameters to the mobile terminal, and the mobile terminal is configured to receive the indoor environment parameters from the control module, and send the adjustment instruction to the control module in accordance with the indoor environment parameters. The control module is further configured to receive an adjustment instruction from the mobile terminal, and send the adjustment instruction to the at least one smart home device.

In yet another aspect, the present disclosure provides in some embodiments an indoor environment adjustment method, including steps of: acquiring indoor environment parameters from at least one sensor, and sending an adjustment instruction to at least one smart home device in accordance with the indoor environment parameters so that the at least one smart home device performs an adjustment operation in accordance with the adjustment instruction.

Optionally, prior to the step of acquiring the indoor environment parameters, the method further includes displaying operation control information and acquiring a user instruction in accordance with the operation control information. The operation control information at least includes indicators for indicating full-automatic control information, semi-automatic control information and the smart home device. The step of acquiring the indoor environment parameters from the at least one sensor includes acquiring the indoor environment parameters from the at least one sensor in accordance with the user instruction. Subsequent to the step of acquiring the indoor environment parameters, the method further includes displaying the indoor environment parameters.

Optionally, in the case that the user instruction indicates that a user has selected the full-automatic control information, the step of acquiring the indoor environment parameters from the at least one sensor in accordance with the user instruction and sending the adjustment instruction to the at least one smart home device in accordance with the indoor environment parameters includes: acquiring the indoor environment parameters from all the sensors in accordance with the user instruction, determining whether or not the indoor environment parameters acquired by each sensor meet a predetermined requirement in accordance with a predetermined priority level, and in the case that the indoor environment parameters acquired by each sensor do not meet the predetermined requirement, sending the adjustment instruction to the corresponding smart home device. In the case that the user instruction indicates that the user has selected the semi-automatic control information and the smart home device, the step of acquiring the indoor environment parameters from the at least one sensor in accordance with the user instruction and sending the adjustment instruction to the at least one smart home device in accordance with the indoor environment parameters includes: acquiring the indoor environment parameters from the sensor corresponding to the smart home device in accordance with the user instruction, determining whether or not the indoor environment parameters meet the predetermined requirement, and in the case that the indoor environment parameters do not meet the predetermined requirement, sending the adjustment instruction to the smart home device.

Optionally, the method further includes, in the case that a gas concentration in the indoor environment parameters does not meet the predetermined requirement, sending a warning signal, so as to enable a warning device to send an audible warning.

Optionally, the operation control information further includes an indicator for indicating the warning device, and in the case that the user instruction indicates that the user has selected the warning device, the method further includes turning off the warning device.

Optionally, the operation control information further includes an indicator for indicating network connection information, and in the case that the user instruction indicates that the user has selected the network connection information, the method further includes acquiring and displaying outdoor environment parameters.

Optionally, the method further includes sending the indoor environment parameters to a mobile terminal, acquiring an adjustment instruction sent by the mobile terminal in accordance with the indoor environment parameters, and sending the adjustment instruction to the at least one smart home device.

According to the controller, the indoor environment adjustment system and the indoor environment adjustment method in the embodiments of the present disclosure, the controller acquires the indoor environment parameters from the sensor, and send the adjustment instruction to the smart home device corresponding to the indoor environment parameters that do not meet the predetermined requirement, so that the smart home device performs the adjustment operation in accordance with the adjustment instruction. As a result, it is able to automatically adjust the indoor environment, thereby to optimize the indoor environment conditions.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
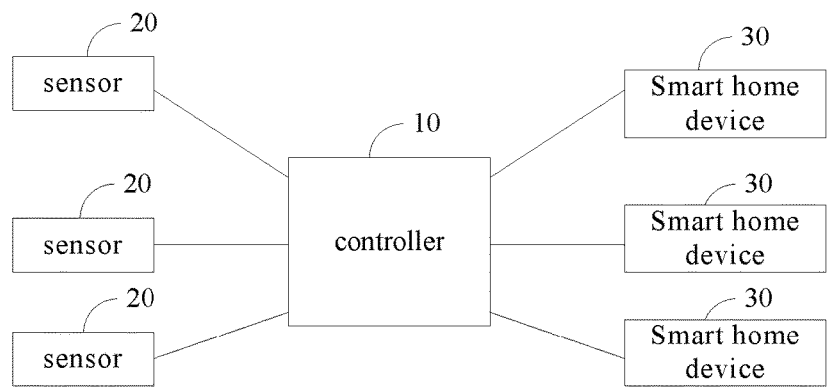
FIG. 1 is a schematic view showing an indoor environment adjustment system according to at least one embodiment of the present disclosure.

The present disclosure provides in some embodiments a controller 10 which, as shown in FIG. 1, is connected to at least one sensor 20 and at least one smart home device 30, and configured to acquire indoor environment parameters collected by the at least one sensor 20, and send an adjustment instruction to the at least one smart home device 30 in accordance with the indoor environment parameters.

Figure 2:
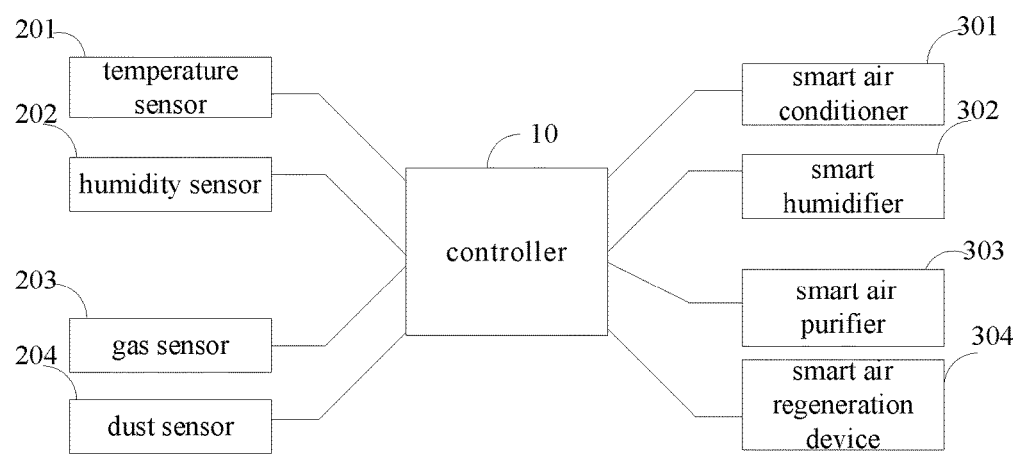
FIG. 2 is another schematic view showing the indoor environment adjustment system according to at least one embodiment of the present disclosure.

As shown in FIG. 2, the at least one sensor 20 may be, for example, at least one of a temperature sensor 201, a humidity sensor 202, a gas sensor 203 and a dust sensor 204. Here, the gas sensor 203 may be, for example, a sensor for detecting carbon monoxide (CO), a sensor for detecting formaldehyde, or a sensor for detecting any other poisonous gases. The dust sensor 204 may be a sensor for detecting particulate matter (PM) 2.5 or a sensor for detecting another particulate matters.

In the case that the sensor includes the temperature sensor 201, the indoor environment parameter collected thereby is an indoor temperature. In the case that the sensor includes the humidity sensor 202, the indoor environment parameter collected thereby is an indoor humidity. In the case that the sensor includes the gas sensor 203, e.g., the sensor for detecting CO, the indoor environment parameter collected thereby is an indoor CO concentration. For example, in the case that the gas sensor 203 is the sensor for detecting formaldehyde, the indoor environment parameter collected thereby is an indoor formaldehyde concentration. In the case that the sensor includes the dust sensor 204, e.g., the sensor for detecting PM2.5, the indoor environment parameter collected thereby is an indoor PM2.5 concentration.

Further, as shown in FIG. 2, in the case that the indoor environment parameters do not meet a predetermined requirement, e.g., the indoor temperature is too high or too low, or the humidity is too high or too low, or the concentration of the gas (such as CO or formaldehyde) is too high, or the concentration of the dust (such as PM2.5) is too high, the corresponding smart home devices 30 may be started to perform an adjustment operation. Principally, the indoor temperature may be adjusted by a smart air conditioner 301, the indoor humidity may be adjusted by a smart humidifier 302 and/or a smart air purifier 303, the indoor gas concentration (e.g., the CO concentration and the formaldehyde concentration) may be adjusted by a smart air regeneration device 304, and the indoor dust concentration (e.g., the PM2.5 concentration) may be adjusted by the smart air purifier 303.

In the case that it is found the indoor temperature is too high or too low in accordance with the collected indoor environment parameter, the controller 10 may send the adjustment instruction to the smart air conditioner 301, and at this time the smart air conditioner 301 may perform the adjustment operation in accordance with the adjustment instruction. In the case that it is found the indoor humidity is too low in accordance with the collected indoor environment parameter, the controller 10 may send the adjustment instruction to the smart humidifier 302 and/or the smart air purifier 303, and at this time, the smart humidifier 302 and/or the smart air purifier 303 may perform the adjustment operation in accordance with the adjustment instruction. In the case that it is found the indoor gas concentration (e.g., the CO concentration or the formaldehyde concentration) is too high in accordance with the collected indoor environment parameter, the controller 10 may send the adjustment instruction to the smart air regeneration device 304, and at this time, the smart air regeneration device 304 may perform the adjustment operation in accordance with the adjustment instruction. In the case that it is found the indoor dust concentration (e.g., the PM2.5 concentration) is too high in accordance with the collected indoor environment parameter, the controller 10 may send the adjustment instruction to the air purifier 303, and at this time, the air purifier 303 may perform the adjustment operation in accordance with the adjustment instruction.

It should be appreciated that, on one hand, the controller 10 may continuously send the adjustment instruction to the at least one smart home device 30 in accordance with the indoor environment parameters, i.e., after each predetermined time period has been expired, the controller 10 may acquire the indoor environment parameters from the sensor 20, and send the adjustment instruction to the smart home device 30 in accordance with the indoor environment parameters.

On the other hand, it is not limited in the embodiments of the present disclosure that the adjustment instruction is merely sent to one smart home device 30 in accordance with one indoor environment parameter. Instead, adjustment instructions may be sent to several smart home devices 30 at the same time.

According to the controller 10 in the embodiments of the present disclosure, it may acquire the indoor environment parameters from the sensor 20, and send the adjustment instruction to the smart home device 30 corresponding to the indoor environment parameters that do not meet the predetermined requirement, so that the smart home device 30 may perform the adjustment operation in accordance with the adjustment instruction. As a result, it is able to automatically adjust the indoor environment, thereby to optimize the indoor environment conditions.

Figure 3:
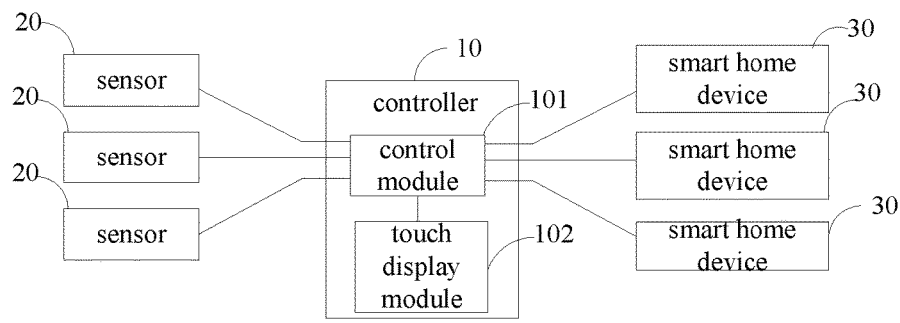
FIG. 3 is yet another schematic view showing the indoor environment adjustment system according to at least one embodiment of the present disclosure.
Figure 4:
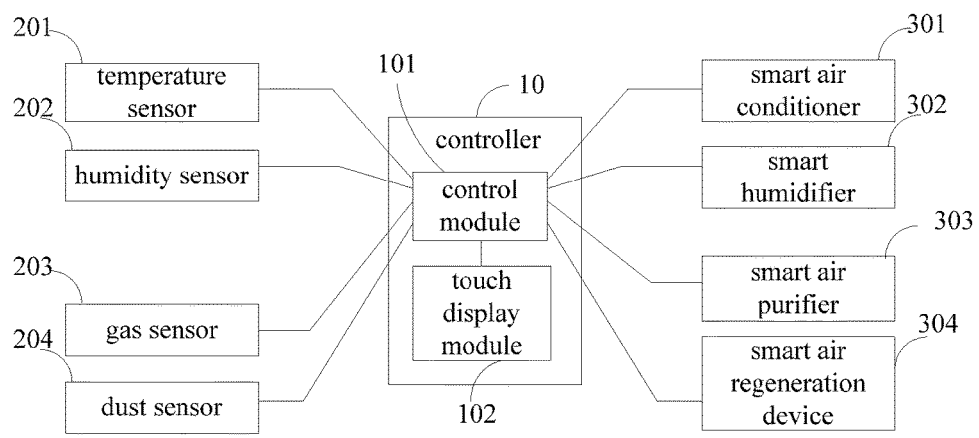
FIG. 4 is still yet another schematic view showing the indoor environment adjustment system according to at least one embodiment of the present disclosure.

Optionally, as shown in FIGS. 3 and 4, the controller 10 includes a control module 101, and a touch display module 102 configured to display operation control information, acquire a user instruction in accordance with the operation control information, and send the user instruction to the control module 101. The operation control information at least includes indicators for indicating full-automatic control information, semi-automatic control information and the smart home device. The control module 101 is configured to acquire the indoor environment parameters from the at least one sensor 20 in accordance with the user instruction, and send the adjustment instruction to the at least one smart home device 30 in accordance with the indoor environment parameters. The touch display module 102 is further configured to display the indoor environment parameters acquired by the control module 101.

It should be appreciated that, the touch display module 102 may display the operation control information, acquire the user instruction based on the operation control information, and send the user instruction to the control module 101. That is, the touch display module 102 displays the operation control information, and in the case that the user has selected at least one piece of the displayed operation control information, the touch display module 102 may acquire the user's selection (i.e., the user instruction) and send the user instruction to the control module 101.

The touch display module 102 may be a liquid crystal display having a touch function. The control module 101 may be a control circuit using Acorn Reduced Instruction-Set Computer (RISC) Machine (ARM) or single chip microcomputer as a digital signal processor.

Figure 5:
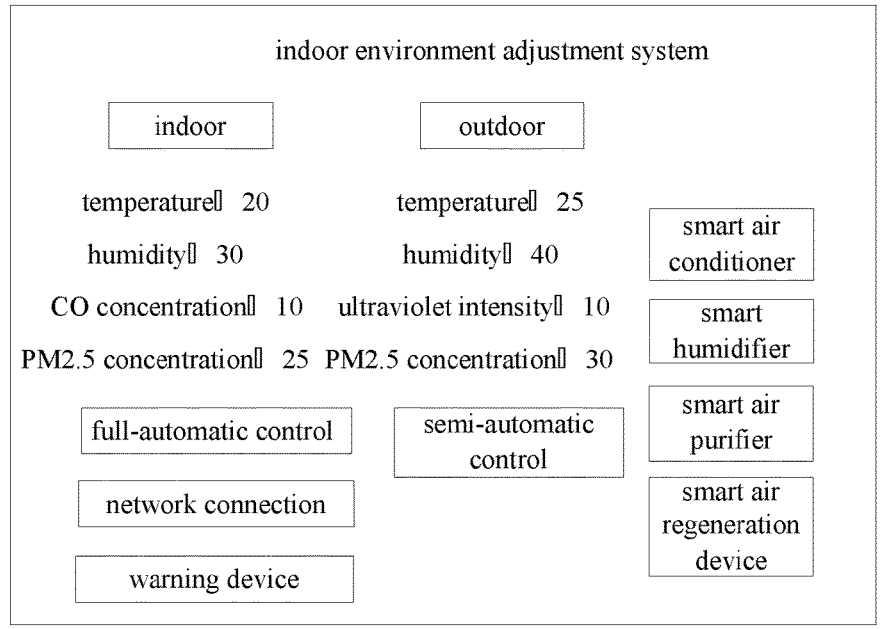
FIG. 5 is a schematic view showing an interface of a touch display module according to at least one embodiment of the present disclosure.

For example, as shown in FIG. 5, the operation control information may be keys displayed on an interface of the touch display module 102, and each key corresponds to one piece of the operation control information. In the case that the user presses a key, it means the operation control information corresponding to this key has been selected, and at this time, the touch display module 102 may acquire the user instruction.

In some embodiments of the present disclosure, it is able to achieve the interaction between human and the controller 10 through the touch display module 102. At this time, it is able to adjust the indoor environment in accordance with the user's selection, and meanwhile improve the user experience.

Optionally, in the case that the user instruction indicates that the user has selected the full-automatic control information, i.e., the user has selected a key for full-automatic control, the control module 101 is configured to acquire the indoor environment parameters from all the sensors 20, and determine whether or not the indoor environment parameters acquired by each sensor 20 meet the predetermined requirement in accordance with a predetermined priority level. In the case that the indoor environment parameters acquired by each sensor 20 do not meet the predetermined requirement, the control module 101 may send the adjustment instruction to a corresponding smart home device 30, and otherwise, it may not perform any operation.

For example, as shown in FIGS. 4 and 5, in the case that the user has selected the key for full-automatic control, the control module 101 may acquire the indoor temperature from the temperature sensor 201, acquire the indoor humidity from the humidifier 202, acquire the indoor CO concentration from the gas sensor 203, and acquire the indoor PM2.5 concentration from the dust sensor 204. Then, in accordance with the predetermined priority level, e.g., the indoor CO concentration>the indoor PM2.5 concentration>the indoor temperature>the indoor humidity, the control module 101 may determine whether or not the indoor CO concentration meets the predetermined requirement, in the case that the indoor CO concentration meets the predetermined requirement, it may not perform any operation, and otherwise, it may send the adjustment instruction to the smart air regeneration device 304. Then, the control module 101 may determine whether or not the indoor PM2.5 concentration meets the predetermined requirement, in the case that the indoor PM2.5 concentration meets the predetermined requirement, it may not perform any operation, and otherwise, it may send the adjustment instruction to the smart air purifier 303. Next, the control module 101 may determine whether or not the indoor temperature meets the predetermined requirement, in the case that the indoor temperature meets the predetermined requirement, it may not perform any operation, and otherwise, it may send the adjustment instruction to the smart air conditioner 301. Finally, the control module 101 may determine whether or not the indoor humidity meets the predetermined requirement, in the case that the indoor humidity meets the predetermined requirement, it may not perform any operation, and otherwise, it may send the adjustment instruction to the smart humidifier 302.

In the case that the user instruction indicates that the user has selected the semi-automatic control information and the smart home device, i.e., the user has selected a key for semi-automatic control and keys for one or more smart home devices, the control module 101 is configured to acquire the indoor environment parameters from the sensor 20 corresponding to the smart home device 30, and determine whether or not the indoor environment parameters meet the predetermined requirement. In the case that the indoor environment parameters do not meet the predetermined requirement, the control module 101 may send the adjustment instruction to the smart home device 30, and otherwise, it may not perform any operation.

For example, as shown in FIGS. 4 and 5, in the case that the user has selected the key for semi-automatic control and the keys for the smart air conditioner and the smart air purifier, the control module 101 may acquire the indoor temperature from the temperature sensor 201 and acquire the indoor PM2.5 concentration from the dust sensor 204. Then, the control module 101 may determine whether or not the indoor PM2.5 concentration meets the predetermined requirement, in the case that the indoor PM2.5 concentration meets the predetermined requirement, it may not perform any operation, and otherwise, it may send the adjustment instruction to the smart air purifier 303. Then, the control module 101 may determine whether or not the indoor temperature meets the predetermined requirement, in the case that the indoor temperature meets the predetermined requirement, it may not perform any operation, and otherwise, it may send the adjustment instruction to the smart air conditioner 301. Here, whether or not the indoor environment parameters meet the predetermined requirement may also be determined in accordance with the predetermined priority level.

Figure 6:
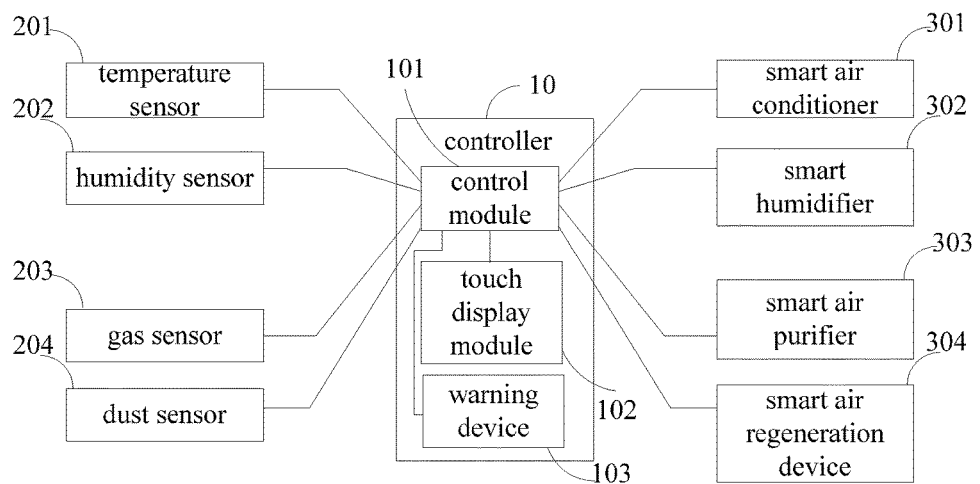
FIG. 6 is still yet another schematic view showing the indoor environment adjustment system according to at least one embodiment of the present disclosure.

Optionally, as shown in FIG. 6, the controller 10 further includes a warning device 103 connected to the control module 101, and in the case that the control module 101 determines that a gas concentration (e.g., the CO concentration) in the indoor environment parameters does not meet the predetermined requirement, a warning signal may be sent to the warning device 103 so that the warning device 103 may send an audible warning.

In this way, the control module 101 may control the smart air regeneration device 304 to perform the adjustment operation in accordance with the indoor environment parameter, and meanwhile it is able to prompt in time a person inside the room that there is a danger, thereby to minimize any possible damage.

Optionally, the operation control information further includes an indicator for indicating the warning device. As shown in FIG. 5, the indicator for indicating the warning device may also be a key displayed on the interface of the touch display module 102. In the case that the user instruction indicates that the user has selected the warning device, the control module 101 is further configured to turn off the warning device 103 connected thereto.

Here, in the case that the key for the warning device 103 has been selected, it means that the warning device 103 is reset and turned off. In this way, it is able to prevent the warning device 103 from making the audible alarm for a long period of time.

Figure 7:
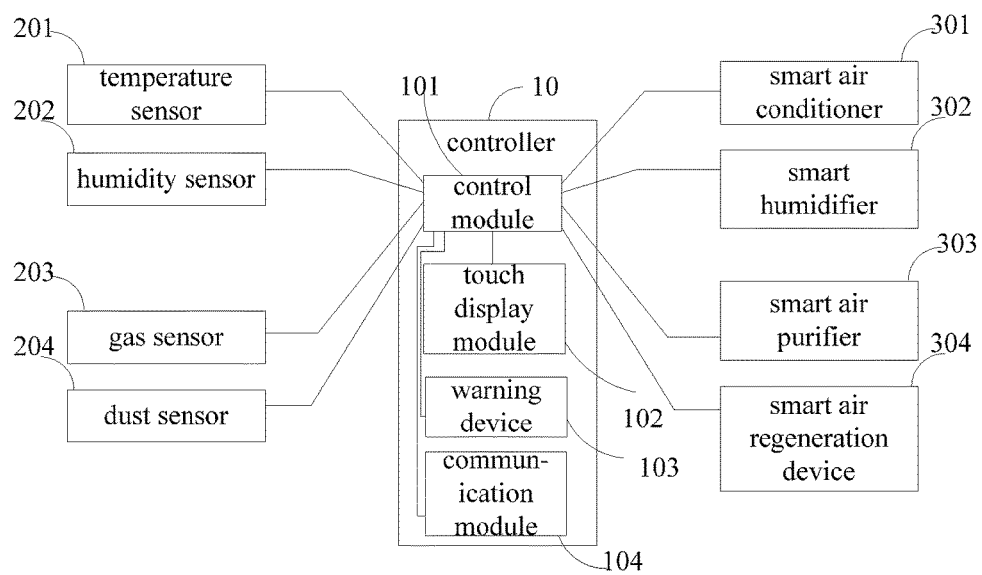
FIG. 7 is still yet another schematic view showing the indoor environment adjustment system according to at least one embodiment of the present disclosure.

Optionally, the operation control information further includes an indicator for indicating network connection information. As shown in FIG. 5, the indicator for indicating the network connection information may also be a key displayed on the interface of the touch display module 102. In the case that the user instruction indicates that the user has selected the network connection information, the control module 101 is further configured to acquire outdoor environment parameters from a communication module 104, and the touch display module 102 is further configured to display the outdoor environment parameters acquired by the control module. As shown in FIG. 7, the controller 10 further includes the communication module 104.

Through the communication module 104, it is able to acquire network data, e.g., the outdoor environment parameters. In addition, after the outdoor environment parameters have been displayed on the touch display module 102, the user may view the outdoor environment, so as to take necessary measures before going out.

The present disclosure further provides in some embodiments an indoor environment adjustment system which, as shown in FIGS. 1-7, includes at least one sensor 20, at least one smart home device 30 and the above-mentioned controller 10. The sensor 20 is configured to collect indoor environment parameters, and the smart home device 30 is configured to receive an adjustment instruction from the control module 101 of the controller 10 and perform an adjustment operation in accordance with the adjustment instruction.

It should be appreciated that, the number and types of the sensors 20 are not particularly defined herein, as long as the indoor environment parameters may be collected. In other words, the sensors 20 may include any other sensors, e.g., a sensor for detecting radiation, apart from the above-mentioned temperature sensor 201, the humidity sensor 202, the gas sensor 203 and the dust sensor 204.

In addition, the number and types of the smart home devices are not particularly defined herein, but the smart home device shall be selected in accordance with the type of the sensor 20, so as to perform the adjustment operation in accordance with the indoor environment parameter collected by the sensor 20. In other words, the smart home devices may include any other devices capable of improving the indoor environment in accordance with the indoor environment parameters, apart from the smart air conditioner 301 for improving the indoor temperature, the smart humidifier 302 and/or smart air purifier 303 for improving the indoor humidity, the smart air regeneration device 304 for improving the indoor gas concentration, and the smart air purifier 303 for improving the indoor dust concentration.

Figure 8:
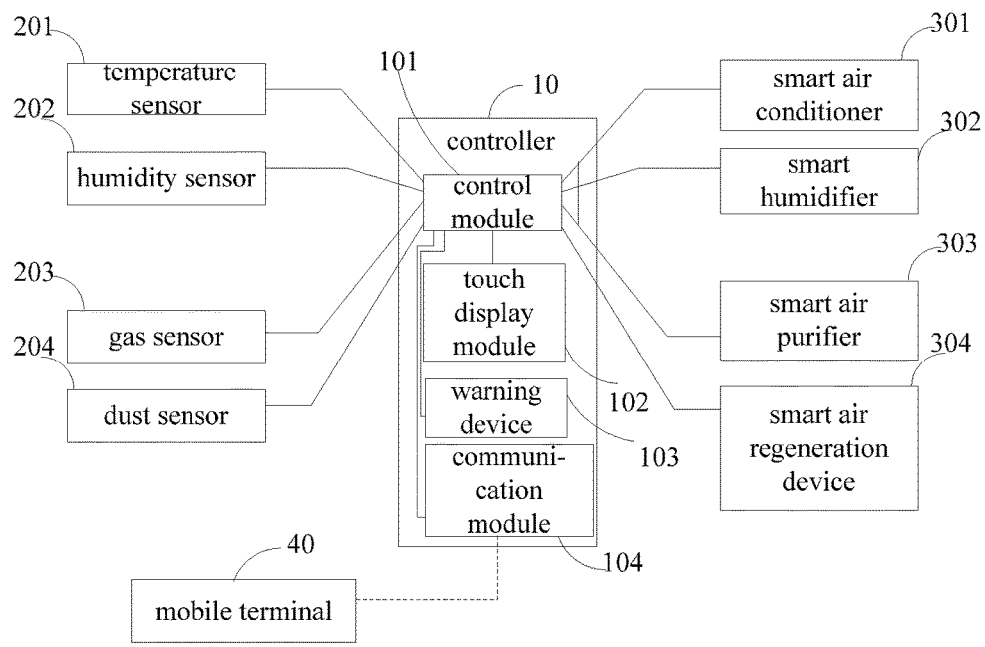
FIG. 8 is still yet another schematic view showing the indoor environment adjustment system according to at least one embodiment of the present disclosure.

Optionally, as shown in FIG. 8, the indoor environment adjustment system further includes a mobile terminal 40, the control module 101 is further configured to send the indoor environment parameter to the mobile terminal 40, and the mobile terminal 40 is configured to receive the indoor environment parameters from the control module 101, and send the adjustment instruction to the control module 101 in accordance with the indoor environment parameters. The control module 101 is further configured to receive an adjustment instruction from the mobile terminal 40, and send the adjustment instruction to the smart home device 30.

The mobile terminal 40 may be a mobile phone, a flat-panel computer, a laptop computer, a desktop computer, and so on.

In this way, in the case that the user is not at home, it is still able for the user to communicate with the controller 10 via the mobile terminal 40, so as to acquire the indoor environment parameters and the outdoor environment parameters and send the adjustment instruction to the control module 101 in accordance with these parameters, thereby to monitor and optimize the indoor environment at different places.

Figure 9:
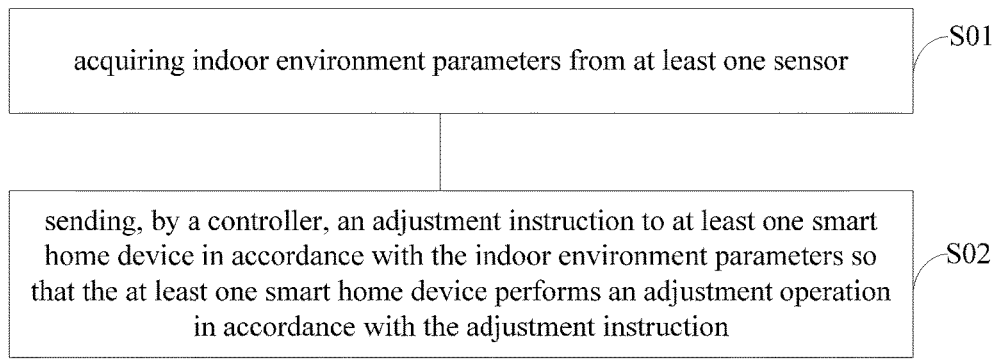
FIG. 9 is a flow chart of an indoor environment adjustment method according to at least one embodiment of the present disclosure.

The present disclosure further provides in some embodiments an indoor environment adjustment method which, as shown in FIG. 9, includes the following steps.

Step S01: the controller 10 acquires the indoor environment parameters from the at least one sensor 20.

The at least one sensor 20 may be, for example, at least one of the temperature sensor 201, the humidity sensor 202, the gas sensor 203 and the dust sensor 204. In the case that the sensor includes the temperature sensor 201, the indoor environment parameter collected thereby is an indoor temperature. In the case that the sensor includes the humidity sensor 202, the indoor environment parameter collected thereby is an indoor humidity. In the case that the sensor includes the gas sensor 203, e.g., the sensor for detecting CO, the indoor environment parameter collected thereby is an indoor CO concentration. For example, in the case that the gas sensor 203 is the sensor for detecting formaldehyde, the indoor environment parameter collected thereby is an indoor formaldehyde concentration. In the case that the sensor includes the dust sensor 204, e.g., the sensor for detecting PM2.5, the indoor environment parameter collected thereby is an indoor PM2.5 concentration.

Step S02: the controller 10 sends an adjustment instruction to the at least one smart home device 30 in accordance with the indoor environment parameters so that the at least one smart home device 30 performs the adjustment operation in accordance with the adjustment instruction.

In the case that the indoor environment parameters do not meet a predetermined requirement, e.g., the indoor temperature is too high or too low, or the humidity is too high or too low, or the concentration of the gas (such as CO or formaldehyde) is too high, or the concentration of the dust (such as PM2.5) is too high, the corresponding smart home devices 30 may be started to perform an adjustment operation. Principally, the indoor temperature may be adjusted by a smart air conditioner 301, the indoor humidity may be adjusted by a smart humidifier 302 and/or a smart air purifier 303, the indoor gas concentration (e.g., the CO concentration and the formaldehyde concentration) may be adjusted by a smart air regeneration device 304, and the indoor dust concentration (e.g., the PM2.5 concentration) may be adjusted by the smart air purifier 303.

According to the indoor environment adjustment method in at least one embodiment of the present disclosure, the controller 10 may acquire the indoor environment parameters from the sensor 20, and send the adjustment instruction to the smart home device 30 corresponding to the indoor environment parameters that do not meet the predetermined requirement, so that the smart home device 30 may perform the adjustment operation in accordance with the adjustment instruction. As a result, it is able to automatically adjust the indoor environment, thereby to optimize the indoor environment conditions.

Optionally, prior to the step of acquiring the indoor environment parameters, the method further includes displaying operation control information and acquiring a user instruction in accordance with the operation control information. The operation control information at least includes indicators for indicating full-automatic control information, semi-automatic control information and the smart home device. The step of acquiring the indoor environment parameters from the at least one sensor 20 includes acquiring the indoor environment parameters from the at least one sensor in accordance with the user instruction. Subsequent to the step of acquiring the indoor environment parameters, the method further includes displaying the indoor environment parameters.

Here, the controller 10 may display the operation control information through the touch display module 102. In the case that the user has selected at least one piece of the displayed operation control information, the touch display module 102 may acquire the user's selection (i.e., the user instruction), and send the user instruction to the control module 101. Then, the control module 101 may acquire the indoor environment parameters from the at least one sensor 20 in accordance with the user instruction, and send the adjustment instruction to the at least one smart home device 30 in accordance with the indoor environment parameters. In addition, the touch display module 102 may also display the indoor environment parameters acquired by the control module 101.

The operation control information may be keys displayed on the interface of the touch display module 102, and each key corresponding one piece of the operation control information. In the case that the user presses a key, the operation control information corresponding this key may be selected.

Optionally, in the case that the user instruction indicates that a user has selected the full-automatic control information, the step of acquiring the indoor environment parameters from the at least one sensor 20 in accordance with the user instruction and sending the adjustment instruction to the at least one smart home device 30 in accordance with the indoor environment parameters includes: acquiring the indoor environment parameters from all the sensors 20 in accordance with the user instruction, determining whether or not the indoor environment parameters acquired by each sensor 20 meet the predetermined requirement in accordance with the predetermined priority level, in the case that the indoor environment parameters acquired by the sensor 20 do not meet the predetermined requirement, sending the adjustment instruction to the corresponding smart home device 30, and otherwise, not performing any operation.

For example, in the case that the user has selected the key for full-automatic control, the control module 101 may acquire the indoor temperature from the temperature sensor 201, acquire the indoor humidity from the humidity sensor 202, acquire the indoor CO concentration from the gas sensor 203, and acquire the indoor PM2.5 concentration from the dust sensor 204. Then, in accordance with the predetermined priority level, e.g., the indoor CO concentration>the indoor PM2.5 concentration>the indoor temperature>the indoor humidity, the control module 101 may determine whether or not the indoor CO concentration meets the predetermined requirement, in the case that the indoor CO concentration meets the predetermined requirement, it may not perform any operation, and otherwise, it may send the adjustment instruction to the smart air regeneration device 304. Then, the control module 101 may determine whether or not the indoor PM2.5 concentration meets the predetermined requirement, in the case that the indoor PM2.5 concentration meets the predetermined requirement, it may not perform any operation, and otherwise, it may send the adjustment instruction to the smart air purifier 303. Next, the control module 101 may determine whether or not the indoor temperature meets the predetermined requirement, in the case that the indoor temperature meets the predetermined requirement, it may not perform any operation, and otherwise, it may send the adjustment instruction to the smart air conditioner 301. Finally, the control module 101 may determine whether or not the indoor humidity meets the predetermined requirement, in the case that the indoor humidity meets the predetermined requirement, it may not perform any operation, and otherwise, it may send the adjustment instruction to the smart humidifier 302.

In the case that the user instruction indicates that the user has selected the semi-automatic control information and the smart home device, the step of acquiring the indoor environment parameters from the at least one sensor 20 in accordance with the user instruction and sending the adjustment instruction to the at least one smart home device 30 in accordance with the indoor environment parameters includes: acquiring the indoor environment parameters from the sensor 20 corresponding to the smart home device 30 in accordance with the user instruction, determining whether or not the indoor environment parameters meet the predetermined requirement, in the case that the indoor environment parameters do not meet the predetermined requirement, sending the adjustment instruction to the smart home device, and otherwise, not performing any operation.

For example, in the case that the user has selected the key for semi-automatic control and the keys for the smart air conditioner and the smart air purifier, the control module 101 may acquire the indoor temperature from the temperature sensor 201 and acquire the indoor PM2.5 concentration from the dust sensor 204. Then, the control module 101 may determine whether or not the indoor PM2.5 concentration meets the predetermined requirement, in the case that the indoor PM2.5 concentration meets the predetermined requirement, it may not perform any operation, and otherwise, it may send the adjustment instruction to the smart air purifier 303. Then, the control module 101 may determine whether or not the indoor temperature meets the predetermined requirement, in the case that the indoor temperature meets the predetermined requirement, it may not perform any operation, and otherwise, it may send the adjustment instruction to the smart air conditioner 301. Here, whether or not the indoor environment parameters meet the predetermined requirement may also be determined in accordance with the predetermined priority level.

Optionally, the method further includes, in the case that the control module 101 determines that a gas concentration in the indoor environment parameters does not meet the predetermined requirement, sending a warning signal, so as to enable the warning device 103 to send an audible warning.

In this way, the control module 101 may control the smart air regeneration device 304 to perform the adjustment operation in accordance with the indoor environment parameter, and meanwhile it is able to prompt in time a person inside the room that there is a danger, thereby to minimize any possible damage.

Optionally, the operation control information further includes an indicator for indicating the warning device, i.e., the indicator for indicating the warning device may also be a key displayed on the interface of the touch display module 102. In the case that the user instruction indicates that the user has selected the warning device, the method further includes turning off the warning device 103. In this way, it is able to prevent the warning device 103 from making the audible warning for a long period of time.

Optionally, the operation control information further includes an indicator for indicating network connection information, i.e., the indicator for indicating the network connection information may also be a key displayed on the interface of the touch display module 102. In the case that the user instruction indicates that the user has selected the network connection information, the method further includes acquiring outdoor environment parameters via the communication module 104 and displaying the outdoor environment parameters via the touch display module 102.

Through the communication module 104, it is able to acquire network data, e.g., the outdoor environment parameters. In addition, after the outdoor environment parameters have been displayed on the touch display module 102, the user may view the outdoor environment, so as to take necessary measures before going out.

Optionally, the method further includes sending, by the control module 101, the indoor environment parameters to the mobile terminal 40, receiving an adjustment instruction sent by the mobile terminal 40 in accordance with the indoor environment parameters, and sending the adjustment instruction to the at least one smart home device 30.

In other words, the indoor environment adjustment system further includes the mobile terminal 40 connected to the control module 101 via the communication module 104. The mobile terminal 40 may acquire and select the operation control information displayed by the touch display module 102 via the communication module 104. In addition, the touch display module 102 may acquire the user instruction in accordance with the operation control information, and send the user instruction to the control module 101. Then, the control module 101 may acquire the indoor environment parameters from the sensor in accordance with the user instruction, and send the adjustment instruction to the at least one smart home device in accordance with the indoor environment parameters.

In this way, in the case that the user is not at home, it is still able for the user to communicate with the controller 10 via the mobile terminal 40, so as to acquire the indoor environment parameters and the outdoor environment parameters and send the adjustment instruction to the control module 101 in accordance with these parameters, thereby to monitor and optimize the indoor environment at different places.

Figure 10:
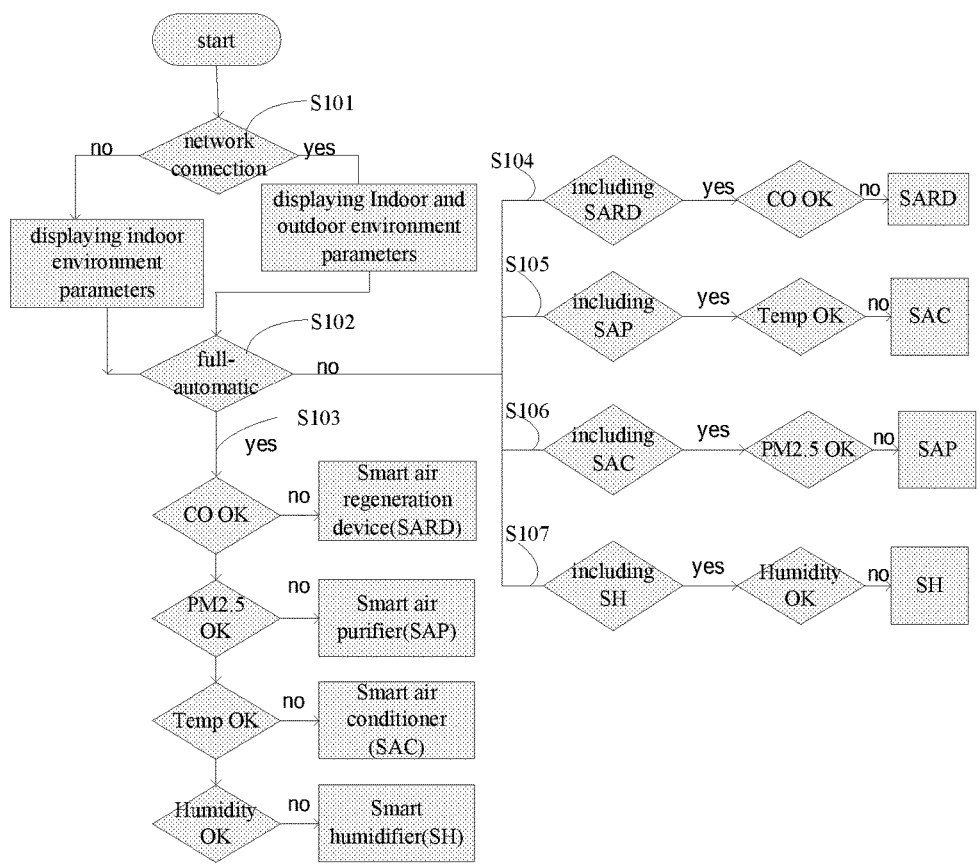
FIG. 10 is another flow chart of the indoor environment adjustment method according to at least one embodiment of the present disclosure.

The specific procedures for the adjustment of the indoor environment will be described hereinafter. As shown in FIG. 10, the indoor environment adjustment method includes the following steps.

Step S101: determining whether or not the user instruction indicates that the user has selected the network connection information, in the case of yes, displaying the indoor and outdoor environment parameters, otherwise displaying the indoor environment parameters, and proceeding to Step S102;

Step S102: determining whether or not the user instruction indicates that the user has selected the full-automatic control information, in the case of yes, proceeding to Step S103, otherwise determining whether or not the user instruction indicates that the user has selected the semi-automatic control information and the smart home device, in the case of yes, proceeding to Steps S104-S107.

Step S103: determining whether or not the indoor CO concentration, the indoor PM2.5 concentration, the indoor temperature and the indoor humidity meet the predetermined requirement sequentially in accordance with the predetermined priority level, in the case of yes, not performing any operation, and otherwise, sending the adjustment instruction to the corresponding smart home device.

Step S104: determining whether or not the user instruction indicates that the user has selected the smart air regeneration device, in the case of yes, determining whether or not the indoor CO concentration meets the predetermined requirement, in the case of yes, not performing any operation, and otherwise, sending the adjustment instruction to the smart air regeneration device 304.

Step S105: determining whether or not the user instruction indicates that the user has selected the smart air purifier, in the case of yes, determining whether or not the indoor PM2.5 concentration meets the predetermined requirement, in the case of yes, not performing any operation, and otherwise, sending the adjustment instruction to the smart air purifier 303.

Step S106: determining whether or not the user instruction indicates that the user has selected the smart air conditioner, in the case of yes, determining whether or not the indoor temperature meets the predetermined requirement, in the case of yes, not performing any operation, and otherwise, sending the adjustment instruction to the smart air conditioner 301.

Step S107: determining whether or not the user instruction indicates that the user has selected the smart humidifier 302, in the case of yes, determining whether or not the indoor humidity meets the predetermined requirement, in the case of yes, not performing any operation, and otherwise, sending the adjustment instruction to the smart humidifier 302.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A controller, connected to a plurality of sensors and a plurality of smart home devices, and configured to acquire indoor environment parameters collected by the plurality of sensors, and send an adjustment instruction to the plurality of smart home devices in accordance with the indoor environment parameters, wherein the controller further comprises a control module, and a touch display module configured to display operation control information, acquire a user instruction in accordance with the operation control information, and send the user instruction to the control module, wherein the operation control information at least comprises indicators for indicating full-automatic control information, semi-automatic control information, and a part or all of the plurality of smart home devices;

the control module is configured to acquire the indoor environment parameters from the plurality of sensors in accordance with the user instruction, and send the adjustment instruction to a part or all of the plurality of smart home devices in accordance with the indoor environment parameters; and the touch display module is further configured to display the indoor environment parameters acquired by the control module, in response to the user instruction indicating that a user has selected the full-automatic control information, the control module is configured to acquire the indoor environment parameters from all the sensors, determine whether or not the indoor environment parameters acquired by each sensor meet a predetermined requirement subsequently in accordance with a predetermined priority level, and in the case that the indoor environment parameter acquired by any one of all sensors does not meet the predetermined requirement, send the adjustment instruction to the corresponding smart home device; and in response to the user instruction indicating that the user has selected the semi-automatic control information and a part of the plurality of smart home devices, the control module is configured to acquire the indoor environment parameters from sensors corresponding to the part of the plurality of smart home devices, determine whether or not the indoor environment parameters meet the predetermined requirement, and in the case that the indoor environment parameters do not meet the predetermined requirement, send the adjustment instruction to the part of smart home devices;

wherein the indoor environment parameters include an indoor humidity, an indoor CO concentration, an indoor formaldehyde concentration and an indoor PM2.5 concentration; and wherein the plurality of smart home devices includes a smart air conditioner, a smart humidifier, a smart air purifier and an air regeneration device.

2. The controller according to claim 1, further comprising a warning device connected to the control module, and in the case that the control module determines that a gas concentration in the indoor environment parameters does not meet the predetermined requirement, a warning signal is sent to the warning device so that the warning device sends an audible warning.

3. The controller according to claim 2, wherein the operation control information further comprises an indicator for indicating the warning device, and in response to the user instruction indicating that the user has selected the warning device, the control module is further configured to turn off the warning device connected to the control module.

4. An indoor environment adjustment system, comprising a plurality of sensors, a plurality of smart home devices and the controller according to claim 3, wherein the plurality of sensors is configured to collect indoor environment parameters, and the plurality of smart home devices is configured to receive an adjustment instruction from the controller and perform an adjustment operation in accordance with the adjustment instruction.

5. An indoor environment adjustment system, comprising a plurality of sensors, a plurality of smart home devices and the controller according to claim 2, wherein the plurality of sensors is configured to collect indoor environment parameters, and the plurality of smart home devices is configured to receive an adjustment instruction from the controller and perform an adjustment operation in accordance with the adjustment instruction.

6. The controller according to claim 1, further comprising a communication module,
wherein the operation control information further comprises an indicator for indicating network connection information;
in response to the user instruction indicating that the user has selected the network connection information, the control module is further configured to acquire outdoor environment parameters via the communication module; and
the touch display module is further configured to display the outdoor environment parameters acquired by the control module.

7. An indoor environment adjustment system, comprising a plurality of sensors, a plurality of smart home devices and the controller according to claim 6, wherein the plurality of sensors is configured to collect indoor environment parameters, and the plurality of smart home devices is configured to receive an adjustment instruction from the controller and perform an adjustment operation in accordance with the adjustment instruction.

8. An indoor environment adjustment system, comprising a plurality of sensors, a plurality of smart home devices and the controller according to claim 1, wherein the plurality of sensors is configured to collect indoor environment parameters, and the plurality of smart home devices is configured to receive an adjustment instruction from the controller and perform an adjustment operation in accordance with the adjustment instruction.

9. The indoor environment adjustment system according to claim 8, further comprising a mobile terminal,
wherein the control module of the controller is further configured to send the indoor environment parameters to the mobile terminal;
the mobile terminal is configured to receive the indoor environment parameters from the control module, and send the adjustment instruction to the control module in accordance with the indoor environment parameters; and the control module is further configured to receive an adjustment instruction from the mobile terminal, and send the adjustment instruction to the at least one smart home device.

10. An indoor environment adjustment method, comprising steps of:
acquiring indoor environment parameters from a plurality of sensors; and
sending an adjustment instruction to a plurality of smart home devices in accordance with the indoor environment parameters so that the plurality of smart home devices performs an adjustment operation in accordance with the adjustment instruction,
wherein prior to the step of acquiring the indoor environment parameters, the indoor environment adjustment method further comprises displaying operation control information and acquiring a user instruction in accordance with the operation control information, wherein the operation control information at least comprises indicators for indicating full-automatic control information, semi-automatic control information and a part or all of the plurality of smart home devices;
the step of acquiring the indoor environment parameters from the plurality of sensors comprises acquiring the indoor environment parameters from the plurality of sensors in accordance with the user instruction; and
subsequent to the step of acquiring the indoor environment parameters, the indoor environment adjustment method further comprises displaying the indoor environment parameters,
in response to the user instruction indicating that a user has selected the full-automatic control information, the step of acquiring the indoor environment parameters from the plurality of sensors in accordance with the user instruction and sending the adjustment instruction to the plurality of smart home devices in accordance with the indoor environment parameters comprises: acquiring the indoor environment parameters from all the sensors in accordance with the user instruction, determining whether or not the indoor environment parameters acquired by each sensor meet a predetermined requirement subsequently in accordance with a predetermined priority level, and in the case that the indoor environment parameters acquired by any one of the plurality of sensors does not meet the predetermined requirement, sending the adjustment instruction to the corresponding smart home device; and
in response to the user instruction indicating that the user has selected the semi-automatic control information and a part of the plurality of smart home devices, the step of acquiring the indoor environment parameters from the plurality of sensors in accordance with the user instruction and sending the adjustment instruction to the plurality of smart home devices in accordance with the indoor environment parameters comprises: acquiring the indoor environment parameters from sensors corresponding to the part of the plurality of smart home devices in accordance with the user instruction, determining whether or not the indoor environment parameters meet the predetermined requirement, and in the case that the indoor environment parameters do not meet the predetermined requirement, sending the adjustment instruction to the part of the plurality of smart home devices, wherein the indoor environment parameters include an indoor humidity, an indoor CO concentration, an indoor formaldehyde concentration and an indoor PM2.5 concentration; and wherein the plurality of smart home devices include a smart air conditioner, a smart humidifier, a smart air purifier and an air regeneration device.

11. The indoor environment adjustment method according to claim 10, further comprising: in the case that a gas concentration in the indoor environment parameters does not meet the predetermined requirement, sending a warning signal, to enable a warning device to send an audible warning.

12. The indoor environment adjustment method according to claim 11, wherein the operation control information further comprises an indicator for indicating the warning device, and in the case that the user instruction indicates that the user has selected the warning device, the indoor environment adjustment method further comprises turning off the warning device.

13. The indoor environment adjustment method according to claim 10, wherein the operation control information further comprises an indicator for indicating network connection information, and in response to the user instruction indicating that the user has selected the network connection information, the indoor environment adjustment method further comprises acquiring and displaying outdoor environment parameters.

14. The indoor environment adjustment method according to claim 13, further comprising sending the indoor environment parameters to a mobile terminal, acquiring an adjustment instruction sent by the mobile terminal in accordance with the indoor environment parameters, and sending the adjustment instruction to the plurality of smart home devices.

* * * * *